(12) United States Patent
Jung (10) Patent No.: US 11,615,489 B2
(45) Date of Patent: Mar. 28, 2023

(54) SYSTEM FOR PROVIDING REMOVALS SIMULATION USING VIRTUAL REALITY AND AUGMENTED REALITY AND BROKERING REAL ESTATE THERETHROUGH

(71) Applicant: Gyou Young Jung, Seoul (KR)

(72) Inventor: Gyou Young Jung, Seoul (KR)

( * ) Notice: Subject to any disclaimer, the term of this patent is extended or adjusted under 35 U.S.C. 154(b) by 393 days.

(21) Appl. No.: 16/475,163

(22) PCT Filed: Apr. 18, 2018

(86) PCT No.: PCT/KR2018/004517
§ 371 (c)(1),
(2) Date: Jul. 1, 2019

(87) PCT Pub. No.: WO2018/208027
PCT Pub. Date: Nov. 15, 2018

(65) Prior Publication Data
US 2019/0333174 A1    Oct. 31, 2019

(30) Foreign Application Priority Data
May 12, 2017  (KR) .................. 10-2017-0059211

(51) Int. Cl.
*G06Q 50/16*   (2012.01)
*G06Q 30/06*   (2012.01)
(Continued)

(52) U.S. Cl.
CPC ......... *G06Q 50/16* (2013.01); *G06Q 30/0619* (2013.01); *G06Q 30/0643* (2013.01); *G06T 19/006* (2013.01); *H04N 13/204* (2018.05)

(58) Field of Classification Search
CPC ..... G06Q 30/0601–0645; G06Q 50/16; G06Q 30/0643; G06Q 30/0619; G06Q 30/06–08
(Continued)

(56) References Cited

U.S. PATENT DOCUMENTS 8,700,537 B1 * 4/2014 Deshpande ...... G06Q 10/08345
705/301
10,528,962 B2 * 1/2020 Rattner .............. G06Q 30/0206
(Continued)

FOREIGN PATENT DOCUMENTS

KR    10-2000-0036803 A    7/2000
KR    10-2000-0037210 A    7/2000
(Continued)

OTHER PUBLICATIONS

Constine, Josh. "Matterport Captures $30M to Scan Rooms into Virtual Reality" (2015) TechCrunch.com (Year: 2015).*
(Continued)

*Primary Examiner* — Marissa Thein
*Assistant Examiner* — Katherine A Barlow
(74) *Attorney, Agent, or Firm* — Bridgeway IP Law Group, PLLC; Sang Ho Lee; Hyun Woo Shin (57) ABSTRACT

Provided is a system for providing removals simulation using VR and AR and brokering real estate therethrough, and the system includes: a background providing unit which extracts background information inside a real estate object provided by a real estate provider and presents the background information to the real estate customer; and an AR providing unit which overlaps props information of a real estate customer on the background information of the real estate object so as to be arbitrarily arranged by the real estate customer, wherein the real estate customer can simulate by overlapping props information on the background information, when the simulation is determined, the determined information is transmitted to a number of moving service servers, and thus provides an advantage in that a number of moving centers can propose moving costs to the real estate customer in a reverse auction manner based on the props information.

5 Claims, 6 Drawing Sheets

(51) Int. Cl.
*H04N 13/204* (2018.01)
*G06T 19/00* (2011.01)
*G06Q 30/0601* (2023.01)

(58) Field of Classification Search
USPC .................................. 705/26.1–27.2, 313
See application file for complete search history.

(56) References Cited

U.S. PATENT DOCUMENTS

| | | | |
|---|---|---|---|
| 10,783,284 B2* | 9/2020 | Loberg | G06F 30/13 |
| 2006/0277119 A1* | 12/2006 | Tung | G06Q 30/0643 |
| | | | 705/26.2 |
| 2013/0138475 A1* | 5/2013 | Allison | G06Q 30/0201 |
| | | | 705/7.29 |
| 2015/0243071 A1* | 8/2015 | Jovanovic | G06F 3/04815 |
| | | | 345/427 |
| 2016/0093007 A1* | 3/2016 | Richardson | G06Q 30/0611 |
| | | | 705/80 |
| 2016/0292761 A1* | 10/2016 | Saric | G06Q 30/0611 |
| 2017/0132841 A1* | 5/2017 | Morrison | G06V 20/20 |
| 2017/0140484 A1* | 5/2017 | Lete | G06Q 50/16 |
| 2018/0159838 A1* | 6/2018 | Dintenfass | H04L 63/0861 |
| 2021/0248674 A1* | 8/2021 | Ogunbunmi | G06T 11/60 |

FOREIGN PATENT DOCUMENTS

| | | |
|---|---|---|
| KR | 10-0372077 B1 | 2/2003 |
| KR | 10-2007-0104144 A | 10/2007 |
| KR | 10-2010-0118943 A | 11/2010 |
| KR | 10-1186618 B1 | 9/2012 |
| KR | 10-2016-0064534 A | 6/2016 |

OTHER PUBLICATIONS

Mangiaracina, Bettina. "Design Your Dream Room with Pottery Barn's New Augmented Reality App." Mobile-AR.Reality.News.com (Year: 2017).*
Bishop, Todd. "Beyond video games: How virtual reality is transforming real estate." GeekWire.com (Year: 2015).*
Dale, Brady. "Virtual Reality Is Driving High-End Condo Sales in Queens" Observer.com (Year: 2015).*
"The increase of Virtural Reality(VR) Usage in the Real Estate Industry", Internet blog, Jan. 17, 2017, Retrieved from http://blog.koreadaily.com/jiny9292/986746.

* cited by examiner

SYSTEM FOR PROVIDING REMOVALS SIMULATION USING VIRTUAL REALITY AND AUGMENTED REALITY AND BROKERING REAL ESTATE THERETHROUGH

TECHNICAL FIELD

The present invention relates to a system for providing a simulation of household items using virtual reality (VR) and augmented reality (AR) and brokering real estate therethrough, and more particularly, to the technical field of a real estate brokerage system which acquires background information of the inside of a seller's real estate for sale or a lessor's real estate for rent through a VR capturing device, acquires information on interior property owned by a buyer of the real estate on sale or a tenant of the real estate for rent through the VR capturing device, virtually matches the interior property to the three-dimensional background information by overlapping the three-dimensional background information with the property information in an AR manner, and then allows a real estate brokerage service and a moving service to operate in conjunction with each other at the lowest cost by electronically using a reverse auction manner through a real estate broker server and a moving service server on the basis of the information.

BACKGROUND ART

According to statistics provided by the Ministry of Land, Infrastructure, and Transport, there were about 123,000 jeonse and monthly-rent transactions in November 2016, and there were about 103,000 housing transactions in the same period of time.

As young people who were born in the early and middle 1980s as the second generation of the baby boomer generation, which denotes explosive population growth of the generation after the end of the Korean war in 1953, reach marriage age and get older, the general trend of the number of people who have actual demand for real estate on sale is expected to decrease ("Future population estimation-population growth scenario," Statistics Korea 2010). Therefore, the trend of housing transactions and jeonse and monthly-rent transactions is generally estimated to be headed downward, but for a real estate transaction, a buyer or a tenant should consider the arrangement of his or her interior property, such as a bed, a wardrobe, a desk, and a table, in the real estate in advance.

For this reason, end users need to know specific information about their property lists in advance and discover whether their property fits the size of the interior of the real estate to which they want to move. When there is an error in such specifications, problems, such as inability to arrange the household items in the actual moving process, may occur.

Accordingly, for convenience of a tenant or a buyer, there have been several technical attempts to broker a real estate sale online via the Internet or to provide a simulation function for digitizing three-dimensional information of the inside of real estate on sale and then arranging a buyer's property.

There is a related prior technology "Information providing method for cost involved moving of online (Korean Patent No. 10-0372077, referred to as "Patent Literature 1" below)."

Patent Literature 1 relates to a method of providing information on moving-related costs online and more particularly to a method of providing information on moving-related costs online in which a member personally drags images of household items, such as a wardrobe and a bookshelf, to a truck to check the volume of household items in real time and a clerk of an affiliated service provider visits the member and calculates moving-related costs.

More specifically, Patent Literature 1 discloses a step of accessing a website run by a web server through a member's terminal and clicking a real-time household item check button in an output main screen window, a step of calling an applet to move to a stuff loading window which is a screen for executing a household item loading simulation, a step of outputting the household item loading window and performing a simulation function for loading a truck with output corresponding household items, a step of transmitting a list of the household items and the loaded form of the household items to the web server after the household items are loaded, and a step of outputting the received content in the form of a bulletin board separately according to the member.

There is another related technology "Mobile digital model house (Korean Patent No. 10-1186618, referred to as "Patent Literature 2" below)."

Patent Literature 2 discloses a model house which is mounted on a vehicle in a movable form and enables a viewer to turn his or her sights in a desired direction while freely moving in the space using a virtual reality (VR) technology as if he or she exists in a space which is currently present or will be present in the future and feels the space with his or her sense of sight and hearing so as to check house-specific views, lights, and privacy invasion, and to experience a simulation of spatial expansion and spatial modification according to occupant options and interior design selections, such as a finishing material and a furniture arrangement. The model house includes a display unit continuously installed along wall surfaces of the internal space of the vehicle, a digital chair for viewing which is installed in the internal space surrounded by the display unit and on which a viewer can sit, a touchpad provided on one side of the digital chair and through which the viewer inputs operation content by personally inputting the operation content or selecting a provided menu, and a control computer which loads and processes data stored in a database in advance according to the operation content input to the touchpad and in which software for transmitting image data generated as processing results to the display unit is embedded. Three-dimensional model data is stored in the database of the control computer in advance, and the control computer causes three-dimensional model data corresponding to the operation content input through the touchpad to interact with loaded content and provides the three-dimensional model data and the loaded content to the viewer in real time by rendering through the display unit.

Likewise, there is "System of real estate agency providing simulation by using virtual reality and augmented reality (Korean Patent No. 10-2000-0019165, referred to as "Patent Literature 3" below)."

Patent Literature 3 discloses an internet service system for providing a variety of moving-related customer services, such as, when a customer accesses an Internet system and inputs actually measured data of household items and the space of a house to which the customer will move before making a contract for a package moving service, providing an effective household item arrangement plan by outputting a top-down view for the arrangement of household items, allowing the customer to decide whether to use a package moving service before making the contract by approximately making an estimate of moving costs, and thereby making it possible to learn of various works related to a move in advance.

However, these prior arts only provide limited visual effects in which it is possible to observe three-dimensional information of the inside of real estate on sale only at a specific angle. Therefore, a function of overlapping actual property and the three-dimensional information shows low accuracy in matching specifications.

Also, a customer is divested of a right to select a moving service provider and a real estate broker because a contract with a predetermined moving service provider or real estate broker is forced. Further, it is not possible to provide a platform for automatically selecting a service provider who charges the lowest commission from among real estate brokers.

PRIOR ART LITERATURE

Patent Literature

Korean Patent No. 10-0372077 (date of publication: Jan. 1, 2003)

Korean Patent No. 10-1186618 (date of publication: Sep. 27, 2012)

Korean Unexamined Patent Publication No. 10-2000-0019165 (date of publication: Jul. 5, 2000)

DISCLOSURE

Technical Problem

A system for providing a simulation of household items using virtual reality (VR) and augmented reality (AR) and brokering real estate therethrough according to the present invention is directed to solving the aforementioned conventional problems and provides the following objectives.

First, the present invention is directed to acquiring internal background information of real estate on sale together with accurate size even without design specification information of the real estate on sale.

Second, the present invention is directed to accurately measuring size of interior property, that is, furniture and the like, even without design information of the furniture and the like, converting information on the interior property into three-dimensional digital data, and performing a simulation by overlapping internal background information of the real estate on sale with the three-dimensional digital data.

Third, the present invention is directed to transmitting property information to a moving service provider, that is, a moving service server, and enabling the moving service provider to automatically make an estimate of a moving service and provide the estimate to a real estate customer without personally visiting the real estate customer.

Fourth, the present invention is directed to proposing a low commission on a real estate brokerage service or a moving service to a real estate customer and then enabling the real estate customer to select various real estate brokers or moving service providers on the basis of the information.

Objectives of the present invention are not limited to those mentioned above, and other objectives not mentioned above will be clearly understood by those of ordinary skill in the art from the following description.

Technical Solution

A system for providing a simulation of household items using virtual reality (VR) and augmented reality (AR) and brokering real estate therethrough according to the present invention has the following solutions.

One aspect of the present invention provides a system for providing a simulation of household items using VR and AR and brokering real estate therethrough, the system including a VR capturing unit provided to an inside of an real estate product provided by a real estate supplier to capture a three-dimensional image of the inside of the real estate product and provided to a real estate customer to capture three-dimensional images of property owned by the real estate customer, a VR capturing section configured to three-dimensionally digitize the image of the inside of the real estate product according to a position of the capturing unit and three-dimensionally digitize the property owned by the real estate customer, a background providing section configured to extract background information of the inside of the real estate product provided by the real estate supplier and provide the background information to the real estate customer, and an AR providing section configured to overlap the background information of the real estate product with property information of the real estate customer so that the property information may be arbitrarily arranged by the real estate customer.

The system for providing a simulation of household items using VR and AR and brokering real estate therethrough may further include a background extraction section configured to extract only the background information from the digitized image of the inside of the real estate product.

The system for providing a simulation of household items using VR and AR and brokering real estate therethrough may further include a property extraction section configured to extract only the property information by removing information other than the property information.

The system for providing a simulation of household items using VR and AR and brokering real estate therethrough may further include a broker server configured to electronically receive whether the real estate customer wants to make a contract for the real estate product from at least the real estate customer and broker a real estate transaction to be electronically made between the real estate customer and the real estate supplier.

In the system for providing a simulation of household items using VR and AR and brokering real estate therethrough, there may be a plurality of broker servers identical to the broker server, and each of the broker servers may further include a reverse auction processing section configured to transmit information on a real estate brokerage commission on the real estate product to the real estate customer or the real estate supplier.

The system for providing a simulation of household items using VR and AR and brokering real estate therethrough may further include a contract processing section configured to, when any one of the plurality of broker servers is selected by the real estate customer, allow a brokerage service contract to be made between the selected broker server and the real estate customer.

The system for providing a simulation of household items using VR and AR and brokering real estate therethrough may further include a moving service server configured to electronically receive whether the real estate customer wants to make a contract for the real estate product from at least the real estate customer such that a moving service contract may be electronically made with the real estate customer.

In the system for providing a simulation of household items using VR and AR and brokering real estate therethrough, there may be a plurality of moving service servers identical to the moving service server, and each of the moving service servers may further include a reverse auction processing section configured to transmit information on a moving service fee corresponding to the property information to the real estate customer.

The system for providing a simulation of household items using VR and AR and brokering real estate therethrough may further include a contract processing section configured to, when any one of the plurality of moving service servers is selected by the real estate customer, allow a moving service contract to be made between the selected moving service server and the real estate customer.

In the system for providing a simulation of household items using VR and AR and brokering real estate therethrough, the property information may include at least one selected from the group consisting of form, shape, and color, and the AR providing section may include a property processing section configured to allow the property information to be arbitrarily adjusted by the real estate customer and overlap the background information.

Advantageous Effects

The system configured as described above for providing a simulation of household items using virtual reality (VR) and augmented reality (AR) and brokering real estate therethrough according to the present invention provides the following effects.

First, a VR capturing unit extracts internal information of real estate on sale, and in this process, obtains not only three-dimensional information but also information on lengths and angles of respective edges and surfaces and distances and angles based on proximity. Therefore, it is possible to acquire internal background information of the real estate on sale together with accurate sizes.

Second, a real estate customer, that is, a tenant or a buyer, may convert information on the size and shape of his or her property, that is, property information, into three-dimensional digital data through the VR capturing unit without direct measuring, and the property information is made to overlap background information of real estate on sale. Therefore, it is possible to perform a three-dimensional simulation on the basis of accurate numerical information.

Third, a real estate customer may perform a simulation by overlapping background information with property information. When such a simulation is determined, finalized information is transmitted to multiple moving service providers, and the multiple moving service providers may automatically calculate costs on the basis of the property information and make proposals to the real estate customer.

Fourth, since multiple moving service providers make proposals to a real estate customer in a reverse auction manner, the real estate customer may select a service provider who proposes a low moving service fee.

Effects of the present invention are not limited to those mentioned above, and other effects not mentioned above will be clearly understood by those of ordinary skill in the art from the following description.

REFERENCE SIGNS LIST

100: platform
101: central control section
102: database
110: VR capturing section
120: background extraction section
130: property extraction section
140: background providing section
150: AR providing section
160: reverse auction processing section
170: contract processing section
200: VR capturing unit
300: broker server
400: moving service server

MODES OF THE INVENTION

A system for providing a simulation of household items using virtual reality (VR) and augmented reality (AR) and brokering real estate therethrough according to the present invention may be diversely modified and have several embodiments. Therefore, specific embodiments will be shown in the drawings and described in detail below. However, this is not intended to limit the present invention to the specific embodiments, and the present invention should be construed as including all modifications, equivalents, and alterations within the spirit and technical scope of the present invention.

Figure 1:
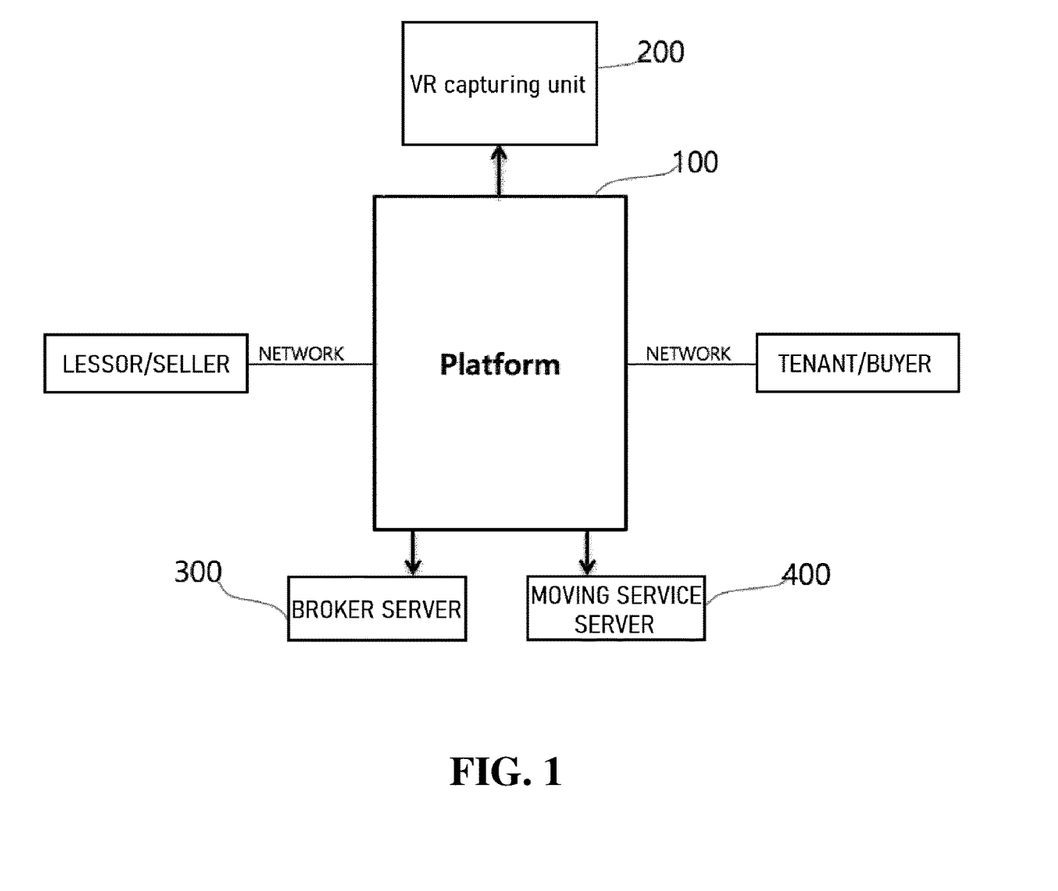
FIG. 1 is a conceptual view of a system for providing a simulation of household items using virtual reality (VR) and augmented reality (AR) and brokering real estate therethrough according to an embodiment of the present invention.
Figure 2:
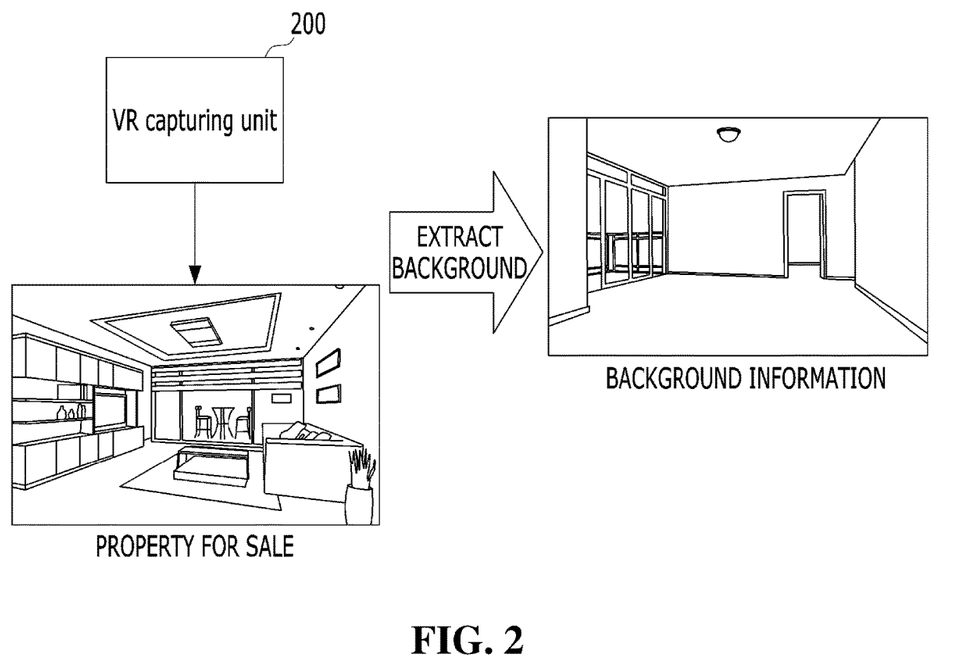
FIG. 2 is a conceptual view showing an operation of extracting internal background information of real estate of a real estate seller (or a lessor) using a VR capturing unit according to an embodiment of the present invention.
Figure 3:
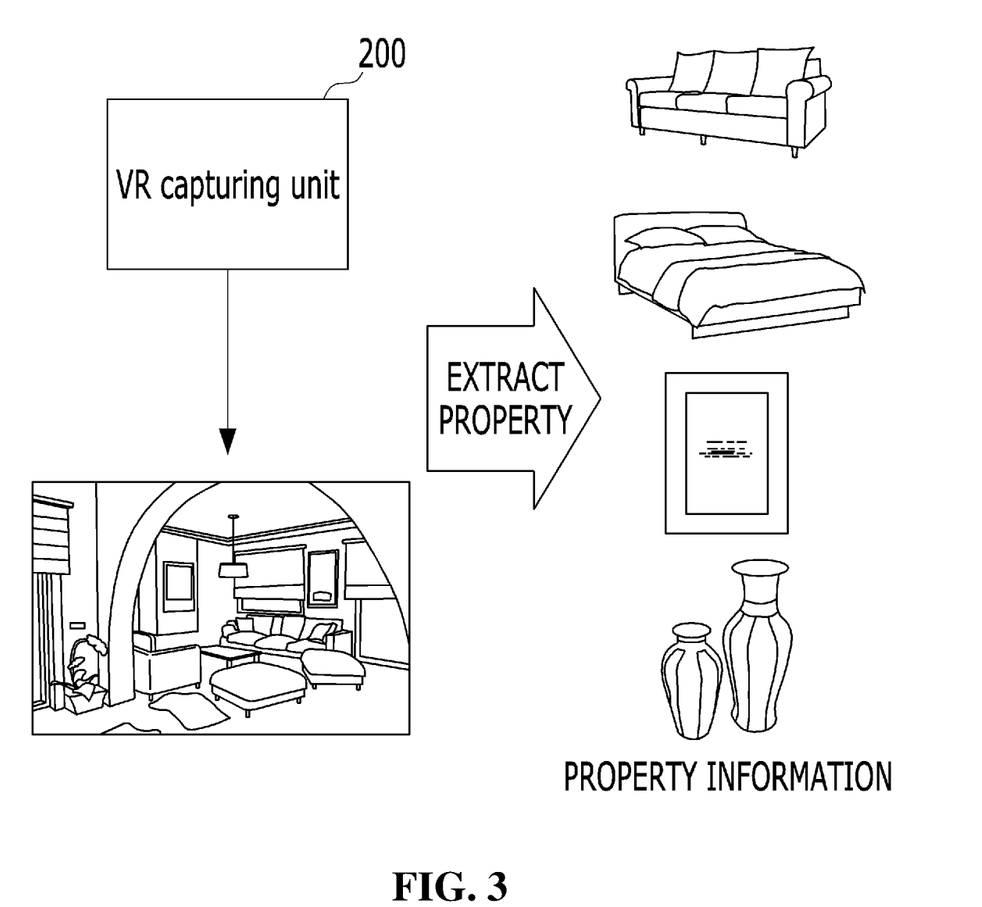
FIG. 3 is a conceptual view showing an operation of extracting interior property information of a real estate buyer (or a tenant) using a VR capturing unit according to an embodiment of the present invention.
Figure 4:
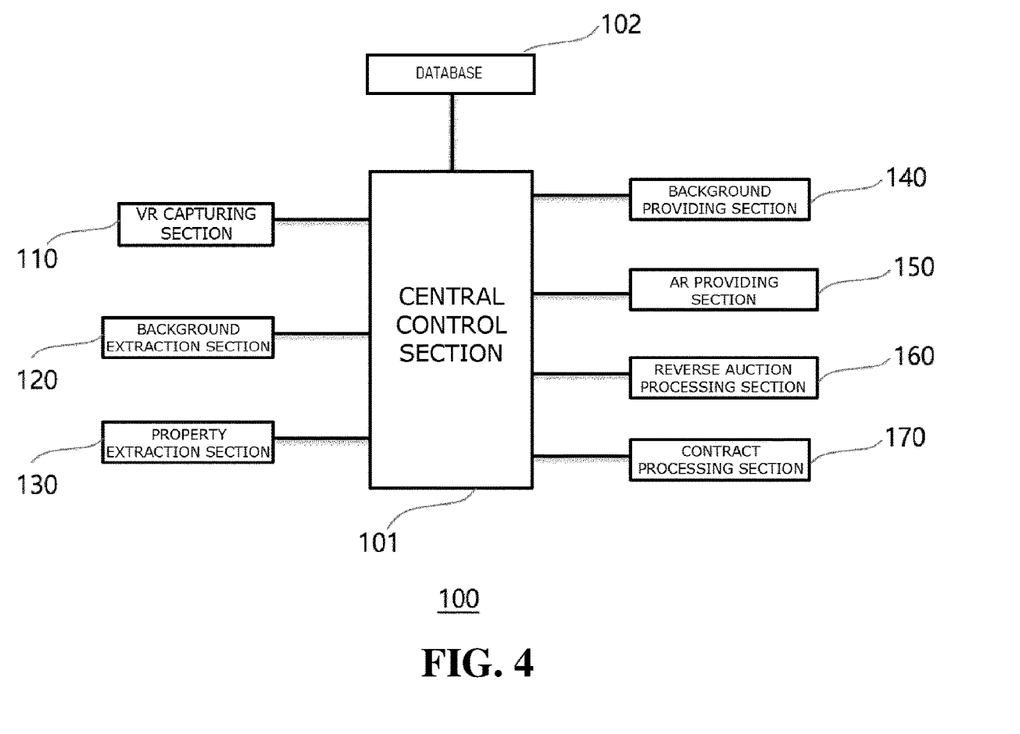
FIG. 4 is a block diagram showing a platform of FIG. 1 and sub-elements thereof.
Figure 5:
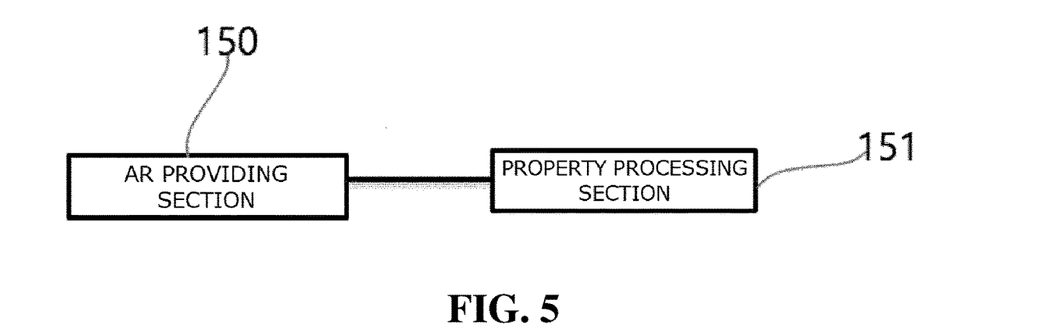
FIG. 5 is a block diagram showing an AR providing section of FIG. 4 and a sub-element included therein.
Figure 6:
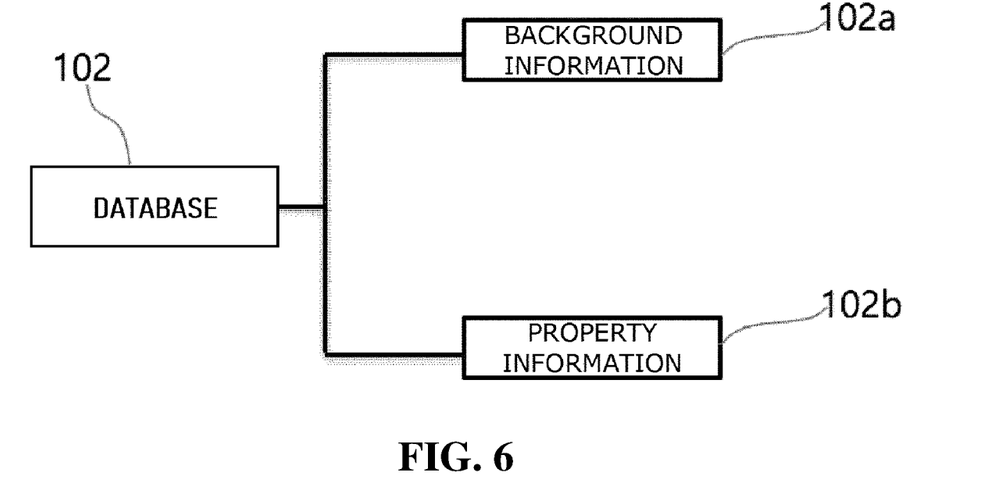
FIG. 6 is a block diagram showing a database of FIG. 1 and background information and property information stored therein.
Figure 7:
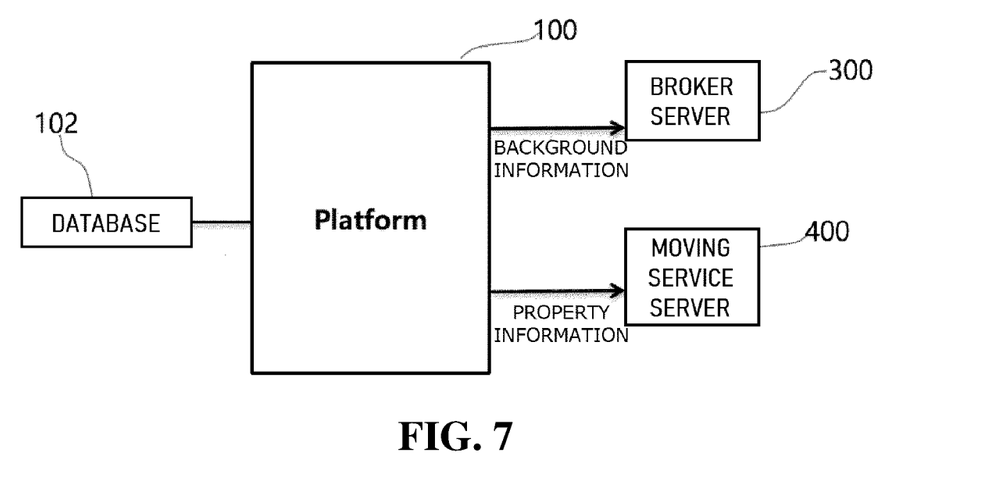
FIG. 7 is a conceptual view showing an operation of providing the background information and the property information of FIG. 6 to a broker server and a moving service server.
Figure 8:
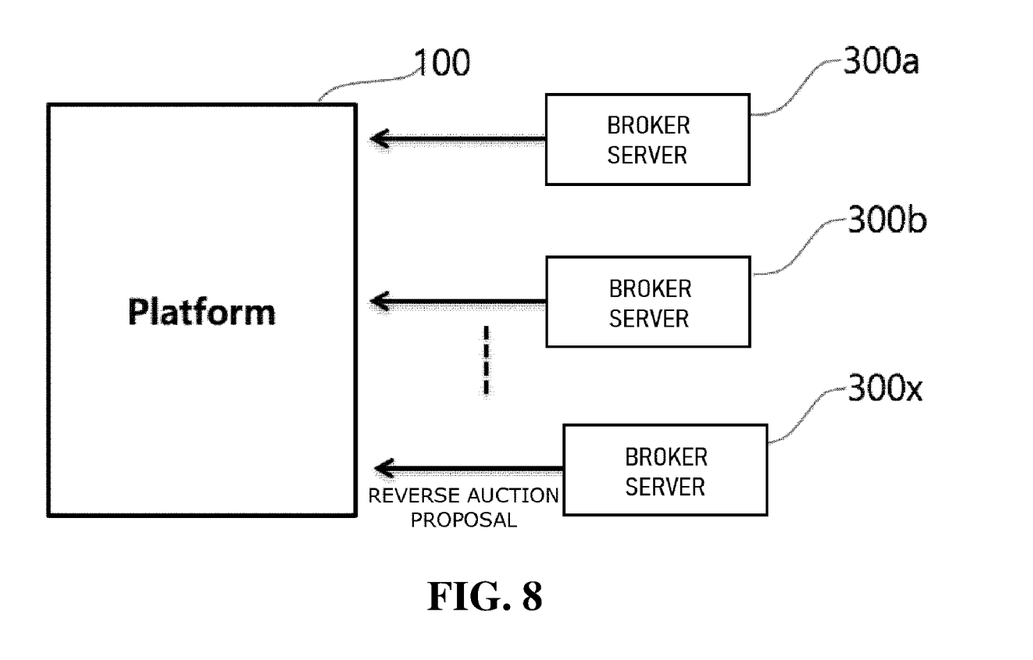
FIG. 8 is a conceptual view showing an operation in which broker servers having received background information according to FIG. 7 provide various kinds of information on corresponding real estate on sale and also bid for a real estate brokerage commission on the corresponding real estate so that a reverse auction may take place.
Figure 9:
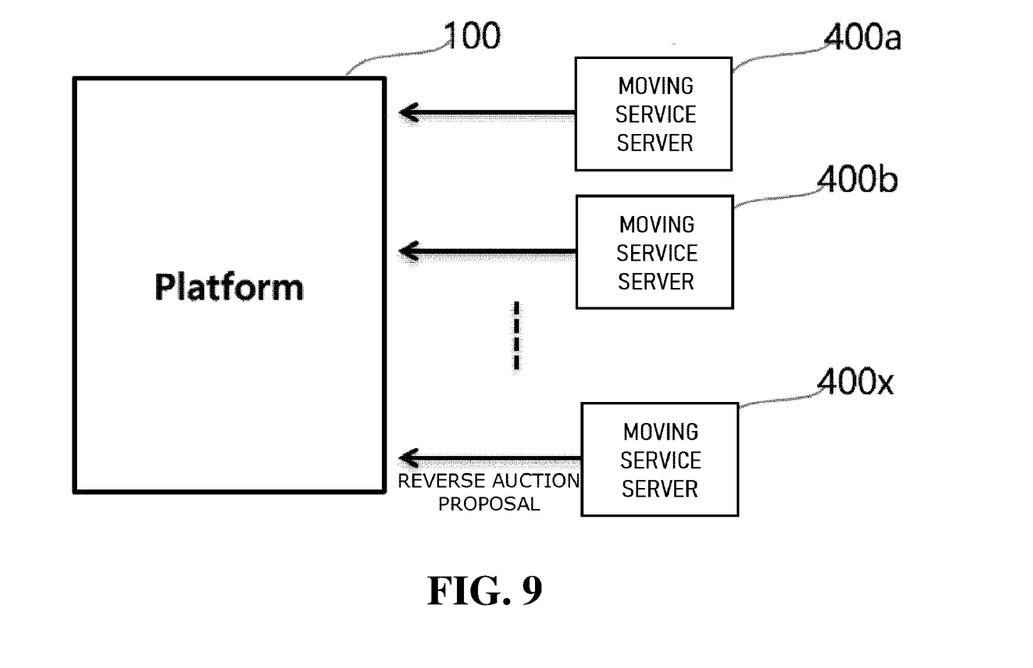
FIG. 9 is a conceptual view showing an operation in which moving service servers having received property information according to FIG. 7 bid for a moving service fee set for interior property so that a reverse auction may take place.

FIG. 1 is a conceptual view of a system for providing a simulation of household items using VR and AR and brokering real estate therethrough according to an embodiment of the present invention. FIG. 2 is a conceptual view showing an operation of extracting internal background information of real estate of a real estate seller (or a lessor) using a VR capturing unit according to an embodiment of the present invention. FIG. 3 is a conceptual view showing an operation of extracting interior property information of a real estate buyer (or a tenant) using a VR capturing unit according to an embodiment of the present invention. FIG. 4 is a block diagram showing a platform of FIG. 1 and sub-elements thereof. FIG. 5 is a block diagram showing an AR providing section of FIG. 4 and a sub-element included therein. FIG. 6 is a block diagram showing a database of FIG. 1 and background information and property information stored therein. FIG. 7 is a conceptual view showing an operation of providing the background information and the property information of FIG. 6 to a broker server and a moving service server. FIG. 8 is a conceptual view showing an operation in which broker servers having received background information according to FIG. 7 provide various kinds of information on corresponding real estate on sale and also bid for a real estate brokerage commission on the corresponding real estate so that a reverse auction may take place. FIG. 9 is a conceptual view showing an operation in which moving service servers having received property information according to FIG. 7 bid for a moving service fee set for interior property so that a reverse auction may take place.

As shown in FIG. 1, a system for providing a simulation of household items using VR and AR and brokering real estate therethrough according to the present invention electronically connects a real estate supplier (e.g., a lessor or a seller) and a real estate customer (e.g., a tenant or a buyer) to each other first and serves as an Internet platform which allows the supplier and the customer to virtually simulate actions that they do offline, for example, from checking the real estate on sale to arranging the customer's interior property to be placed in the real estate on sale.

Further, in order to resolve inconvenience and problems of conventional arts, the system for providing a simulation of household items using VR and AR and brokering real estate therethrough according to the present invention automatically shares household item information of a real estate customer's property with a server for providing a moving service or a connection to such moving service providers (hereinafter, referred to as "moving service server") such that the moving service providers may make estimates for a moving service on the basis of the property information without visiting the real estate customer and provide the estimates to the real estate customer.

The above-described internal background information of a real estate supplier's real estate on sale or the above-described information on a real estate customer's property is converted into three-dimensional VR data and shared with the real estate supplier and the real estate customer. For the conversion to three-dimensional VR data, a VR capturing unit 200 shown in FIG. 1 may be used.

Generally, the VR capturing unit 200 may be classified into two types: i) a rig type used by professionals or ii) an all-in-one camera used by amateurs. First, rig-type photography equipment includes GoPro 360 Hero, GoPro Odyssey, HEADCASE VR, Scopic, and the like.

For the rig-type mainly used by stereoscopic image expert groups or manufacturers, several small cameras or lenses are uniformly installed in one array, and images captured by the respective cameras are stitched together to complete one 360° image.

On the other hand, unlike the rig-type in which several independent cameras are arranged, an all-in-one camera employs one or more fisheye lenses or wide-angle lenses in one body to improve the convenience of photography. Among all-in-one type cameras, there is a launched product which is connected to a smart phone using wireless fidelity (Wi-Fi) and can perform streaming transmission.

Companies or individuals who want to implement the present invention through strong points of respective product groups can find an optimal embodiment of the VR capturing unit 200 with reference to "A Comparative Study for Virtual Reality 360° Content Shooting Equipment Based on Real World (JBE Vol. 21, No. 5, September 2016)" and the like.

As shown in FIG. 2, the system for providing a simulation of household items using VR and AR and brokering real estate therethrough according to the present invention may enter a real estate product of a real estate supplier, perform VR photography on the inside of through the VR capturing unit in the real estate, and then extract only background information.

Subsequently, a VR capturing section 110 included in a platform 100 acquires image information obtained by performing VR photography on the inside of the real estate building and then three-dimensionally digitizes the internal images of the real estate. This information is processed so that a real estate customer may view and simulate the inside of the real estate building by acquiring the information through his or her terminal.

As shown in FIG. 3, the system for providing a simulation of household items using VR and AR and brokering real estate therethrough according to the present invention visits a real estate customer, for example, a house in which the real estate customer currently resides, and the VR capturing unit 200 performs VR photography. Subsequently, only property information may be extracted from the spatial information.

The VR capturing unit 200 is equipment for VR photography, and property images captured in this way are three-dimensionally digitized by the VR capturing section 110 and become objects that can be arranged on background information by the real estate customer.

Background information and/or property information may be acquired through the VR capturing unit 200, or VR-processed information may be received and stored in a database in advance and then used.

The system for providing a simulation of household items using VR and AR and brokering real estate therethrough according to the present invention includes a background providing section 140 and an AR providing section 150.

First, as shown in FIGS. 1 and 4, the background providing section 140 extracts background information of a real estate product, for example, the inside of the building, provided by a real estate supplier and provides the extracted background information to a real estate customer. The real estate customer may receive the background information through a terminal, such as his or her smart phone or a personal computer (PC) and, more preferably, through VR goggles.

Subsequently, using information on property that he or she has or will have and the background information on the basis of AR, the real estate customer may simulate whether the corresponding real estate building is satisfactory, whether all of his or her property can be placed, or how his or her property will be placed. This function is processed by the AR providing section 150 shown in FIGS. 1 and 4.

The system for providing a simulation of household items using VR and AR and brokering real estate therethrough according to the present invention may further include a background extraction section 120.

First, as shown in FIG. 2, the background extraction section 120 may perform VR photography on the inside of real estate on sale, store information on walls, floors, ceilings, built-in furniture, sinks, lights, doors, windows and doors, system windows and doors, built-in air conditioners, bathtubs, washstands, toilets, and the like of the real estate building in advance from three-dimensional digital images, give weights to such information, and eliminate other information.

The above-described background information includes three-dimensional information according to positional information of the VR capturing unit 200 and one or more pieces of information on the form, shape, and color of the inside of the real estate product.

As shown in FIGS. 3 and 4, the system for providing a simulation of household items using VR and AR and brokering real estate therethrough according to the present invention may further include a property extraction section 130.

As described above, the property extraction section 130 may visit a real estate customer, for example, a house or the like of the real estate customer, photograph the VR capturing unit 200, and then extract only property information by removing only the background information (the information on walls, bottoms, ceilings, built-in furniture, sinks, lights, doors, windows and doors, system windows and doors, a built-in air conditioner, bathtubs, washstands, toilets, and the like of the real estate building) from the three-dimensional digital images obtained by the VR capturing section 110. The property may include wallpaper, home appliances, furniture, such as beds, desks, chairs, and bookshelves, and the like.

The property information also includes one or more pieces of information on the form, shape, and color of each property.

The above-described background information and property information may be stored in a database 102 as shown in FIG. 6.

The AR providing section 150 of the system for providing a simulation of household items using VR and AR and brokering real estate therethrough according to the present invention may include a property processing section 151 as shown in FIG. 5.

The property processing section 151 of the AR providing section 151 is an element for customizing the aforementioned form, shape, color, and such similar information constituting the property information according to the real estate customer's taste.

In other words, the real estate customer may increase or reduce angles, sizes, and the like of properties or arbitrarily change the form and color thereof and overlap the background information with the properties. This function is provided by the property processing section 151.

The system for providing a simulation of household items using VR and AR and brokering real estate therethrough according to the present invention may further include a broker server 300 as shown in FIG. 1.

As described above, the broker server 300 may be considered a server which is managed by real estate brokers or provides a connection to the real estate brokers. A contract for real estate purchase may be made between a real estate supplier and a real estate customer through the broker server 300.

As described above, the real estate customer may arbitrarily arrange the property information on the background information using AR. Subsequently, when the real estate customer determines to buy or rent the real estate product, the real estate customer may determine and transfer his or her intention to sign a contract for purchasing or renting the corresponding real estate product on sale through his or her terminal.

The broker server 300 electronically receives the aforementioned determination and intention and may request personal information and the like from the real estate supplier and the real estate customer on the basis of this information. Subsequently, it is possible to sign an electronic contract for the real estate transaction or the like or check the register book. This series of processes may be performed as a replacement for offline processes or to complement offline contract signing.

The broker server 300 may be managed by external real estate brokers or an internal real estate brokerage center managed by the system.

The system for providing a simulation of household items using VR and AR and brokering real estate therethrough according to the present invention may further include a reverse auction processing section 160.

In this case, there may be a plurality of broker servers 300 identical to the broker server 300. As shown in FIGS. 7 and 8, the broker servers 300 separately propose estimates of a real estate brokerage commission on the real estate product to the platform 100 on the basis of the background information, that is, information on the corresponding item, and the reverse auction proposals may be transmitted to the parties to the real estate transaction and, more preferably, the customer and the supplier. Subsequently, the real estate customer or the real estate supplier may select one of the plurality of real estate broker servers 300 through his or her terminal on the basis of the commission information.

In the above case, the system for providing a simulation of household items using VR and AR and brokering real estate therethrough according to the present invention may further include a contract processing section 170.

When any one of the plurality of broker servers 300 is selected by the real estate customer, the contract processing section 170 allows a brokerage service contract to be made between the selected broker server 300 and the real estate customer or the real estate supplier.

The system for providing a simulation of household items using VR and AR and brokering real estate therethrough according to the present invention may further include a moving service server 400 as shown in FIGS. 1 and 7.

The moving service server 400 may be considered a server which is directly managed by moving service providers or provides a connection to the moving service providers.

As described above, the real estate customer may arbitrarily arrange the property information on the background information using AR, and when the real estate customer determines to buy or rent the real estate product thereafter, the real estate customer may determine and transfer his or her intention to sign a contract for purchasing or renting the corresponding real estate product on sale through his or her terminal. Subsequently, the moving service server 400 receives the property information used for the simulation (see FIG. 7) and proposes an appropriate estimate for a moving service, which corresponds to the property information, to the real estate customer's terminal.

In this case, the system for providing a simulation of household items using VR and AR and brokering real estate therethrough according to the present invention may further include a reverse auction processing section 160.

There may be a plurality of moving service servers 400 identical to the moving service server 400 as shown in FIG. 9.

When there are a plurality of moving service servers 400, each of the plurality of moving service servers 400 transmits an estimate, that is, information on a moving service fee, calculated from the property information to the real estate customer. This series of functions are performed by the reverse auction processing section 160.

Subsequently, the system for providing a simulation of household items using VR and AR and brokering real estate therethrough according to the present invention may further include the contract processing section 170.

The real estate customer may select a desired moving service server 400 through his or her terminal with reference to information on the plurality of moving service fees. This "selection" is electronically made such that the contract processing section 170 may allow a moving service contract to be made between the real estate customer and a moving service provider who manages the moving service server 400.

The scope of the present invention is determined by the claims. Parentheses used in the claims are not intended for selective limitations but rather intended to clarify elements, and a statement in parentheses should be construed as an essential element.

The invention claimed is:

1. A system for providing a simulation of household items using virtual reality (VR) and augmented reality (AR) and brokering real estate therethrough, the system comprising:
   a VR capturing unit provided inside of a real estate product of a real estate supplier to capture a three-dimensional image of the inside of the real estate product and provided to a real estate customer to capture three-dimensional images of one or more properties owned by the real estate customer;
   one or more computing devices configured to:
   three-dimensionally digitize the three-dimensional image of the inside of the real estate product according to a position of the VR capturing unit and three-dimensionally digitize the one or more properties owned by the real estate customer;
   extract background information of the inside of the real estate product provided by the real estate supplier via VR photographing the inside of the real estate product and provide the background information to the real estate customer, and extract only the background information from the digitized three-dimensional image of the inside of the real estate product captured by VR photographing by extracting and storing form, shape, and color information on items fixed to the inside of the real estate product and by eliminating other information about the real estate product;
   extract only the property information of the one or more properties owned by the real estate customer via VR photographing the one or more properties owned by the real estate customer by extracting and storing form, shape, and color information on the one or more properties from the digitized three-dimensional image of the one or more properties owned by the real estate customer and by removing information other than the property information, wherein the property information includes at least one selected from the group consisting of form, shape, and color;
   overlap the background information of the inside of the real estate product with the property information of the one or more properties owned by the real estate customer so that the real estate customer customizes an arrangement of the property information; and
   customize the arrangement of the property information by the real estate customer by increasing or reducing angles and sizes of the one or more properties owned by the real estate customer or by arbitrarily changing the form and color thereof according to a preference of the real estate customer, and overlap the background information thereupon;
   a moving service server configured to electronically receive whether the real estate customer wants to make a contract for the real estate product from at least the real estate customer such that a moving service contract is electronically made with the real estate customer, wherein the moving service server receives the property information used for the simulation and proposes an estimate for a moving service, which corresponds to the property information, to a real estate customer's terminal, wherein there are a plurality of moving service servers identical to the moving service server, and each of the plurality of moving service servers is configured to transmit information on a moving service fee corresponding to the property information to the real estate customer; and
   a display device providing a simulation of household items using virtual reality (VR) and augmented reality (AR) to the real estate customer, wherein the VR and AR encompass the overlapped background information of the inside of the real estate product with the property information of the one or more properties owned by the real estate customer.

2. The system of claim 1, further comprising a broker server configured to electronically receive information on whether the real estate customer wants to make a contract for the real estate product from at least the real estate customer and broker a real estate transaction to be electronically made between the real estate customer and the real estate supplier.

3. The system of claim 2, wherein there are a plurality of broker servers identical to the broker server, and each of the plurality of broker servers is configured to transmit information on a real estate brokerage commission on the real estate product to the real estate customer or the real estate supplier.

4. The system of claim 3, wherein the one or more computing devices are further configured to, when any one of the plurality of broker servers is selected by the real estate customer, make a brokerage service contract between the selected broker server and the real estate customer but is not required to do so.

5. The system of claim 1, wherein the one or more computing devices are further configured to, when any one of the plurality of moving service servers is selected by the real estate customer, make a moving service contract to be made between the selected moving service server and the real estate customer.

* * * * *